United States Patent [19]

Sakamoto et al.

[11] Patent Number: 5,506,647
[45] Date of Patent: Apr. 9, 1996

[54] FIELD FRAME CHANGEOVER MECHANISM FOR VIEWFINDER

[75] Inventors: Takamasa Sakamoto, Osaka; Akihiro Baba, Sakai, both of Japan

[73] Assignee: Minolta Camera Kabushiki Kaisha, Osaka, Japan

[21] Appl. No.: 296,870

[22] Filed: Aug. 26, 1994

Related U.S. Application Data

[63] Continuation of Ser. No. 100,934, Aug. 2, 1993, abandoned.

[30]     Foreign Application Priority Data

Aug. 6, 1992   [JP]   Japan .................. 4-055343 U

[51] Int. Cl.$^6$ .................. G03B 17/02; G03B 37/00; G03B 13/10
[52] U.S. Cl. .................. 354/159; 354/94; 354/222
[58] Field of Search .................. 354/152, 156, 354/159, 94, 222

[56]            References Cited

U.S. PATENT DOCUMENTS

| | | | |
|---|---|---|---|
| 3,490,844 | 1/1970 | Sapp, Jr. et al. | 355/40 |
| 4,678,300 | 7/1987 | Beach | 354/21 |
| 4,682,870 | 7/1987 | Atkinson | 354/275 |
| 4,716,427 | 12/1987 | Shyu | 354/222 |
| 5,066,971 | 11/1991 | Kodaira | 354/465 |
| 5,086,311 | 2/1992 | Naka et al. | 354/195.1 |
| 5,255,030 | 10/1993 | Mukai et al. | 354/94 |

FOREIGN PATENT DOCUMENTS

| | | |
|---|---|---|
| 3-273223 | 12/1991 | Japan . |
| 4-3430 U | 1/1992 | Japan . |
| 4-113341 | 4/1992 | Japan . |
| 4-163536 | 6/1992 | Japan . |

Primary Examiner—Michael L. Gellner
Assistant Examiner—Nicholas J. Tuccillo
Attorney, Agent, or Firm—Willian Brinks Hofer Gilson & Lione

[57]            ABSTRACT

A field frame changeover mechanism suitable for a single-lens reflex camera, which allows clear confirmation of the photo range without increasing the size of the camera.

The mechanism has darkening plates movable between a darkening position where the plates cover a part of the focusing screen and an open position where the focusing screen is uncovered by the plates. When the mirror which reflects the light transmitted from the photo-taking lens of the camera to the optical system of the viewfinder of the camera moves from an observation position located in the path of light transmitted through the photo-taking lens to a photo-taking position, the darkening plates retract from the locus of the mirror's movement in a correlated manner.

10 Claims, 11 Drawing Sheets

FIELD FRAME CHANGEOVER MECHANISM FOR VIEWFINDER

This application is a continuation of application Ser. No. 08/100,934, filed Aug. 2, 1993, now abandoned.

BACKGROUND OF THE INVENTION

1. Field of the Invention

This invention relates to a field frame changeover mechanism for changing a viewfinder field of a camera between two different exposure modes.

2. Description of the Prior Art

Conventionally, in addition to taking full-size photos by exposing an entire frame of film when the shutter is released, cameras which can perform panorama photo-taking by covering the top and bottom portions of a frame to a prescribed width, and exposing only the horizontal rectangular strip in between, have also been provided. In these cameras, a transparent plate, such as a focusing screen, which indicates the exposure area in panorama mode with a frame is generally used; however, with this method, it is difficult to confirm the exposure area at the time of panorama phototaking, and it is also difficult to know whether the camera is in full-size or panorama photo-taking mode.

In response to this situation, a camera is provided which contains a mechanism which changes the field from that for full-size photo-taking to a horizontally longer field for panorama photo-taking by placing darkening plates in the optical path in the vicinity of the focusing screen.

In a single lens reflex camera, it is desirable to apply a field frame changeover mechanism of a type which inserts darkening plates in order to provide accurate confirmation of the exposure area. However, in a single lens reflex camera, because the mirror which directs the light transmitted through the photo-taking lens to the viewfinder during flaming is moved up to the vicinity of the focusing screen during shutter release, the movement of the mirror restricts the arrangement of the changeover mechanism, which could necessitate an increase in the size of the camera.

SUMMARY OF THE INVENTION

An object of the present invention is to provide a field frame changeover mechanism, suitable for a single lens reflex camera, which solves the above problem and is capable of clearly confirming the photo range without increasing the size of the camera.

The viewfinder field frame changeover mechanism of the present invention is characterized by the fact that the first field for the full-size photo-taking and the second field having a view area different from the first field are alternated by moving darkening plates located between the focusing screen and the mirror which directs the light transmitted through the photo-taking lens to the viewfinder during flaming, and the darkening plates retract from the locus of movement of the mirror as the mirror moves up. Because this construction prevents mechanical interference between the darkening plates and the mirror, the darkening plates do not restrict the movement of the mirror and, thus, make an increase in the camera's size unnecessary.

Further, according to the present invention, the first/ second field frame changeover mechanism is situated on the side of the mirror box of a single lens reflex camera.

Moreover, according to an alternative embodiment of the invention, in a camera of the type using more than one mirror in place of a pentaprism (hereinafter called a pentamirror), the darkening plates for switching the field frame are situated inside the hollow pentamirror near the focusing screen.

BRIEF DESCRIPTION OF THE DRAWINGS

The above objects and features of the present invention are set forth with particularity in the appended claims. The present invention, both as to its organization and manner of operation, together with further objects and advantages thereof, may best be understood by reference to the following detailed description, taken in connection with the accompanying drawings.

DETAILED DESCRIPTION OF THE PREFERRED EMBODIMENTS

The camera viewfinder field frame changeover mechanism of a first embodiment of the present invention is described in detail below with reference to FIG. 1 through FIG. 9. The viewfinder field frame changeover mechanism is constructed such that it performs switching between a field for full-size photo-taking and a field for panorama photo-taking, which has a different aspect ratio.

Figure 1:
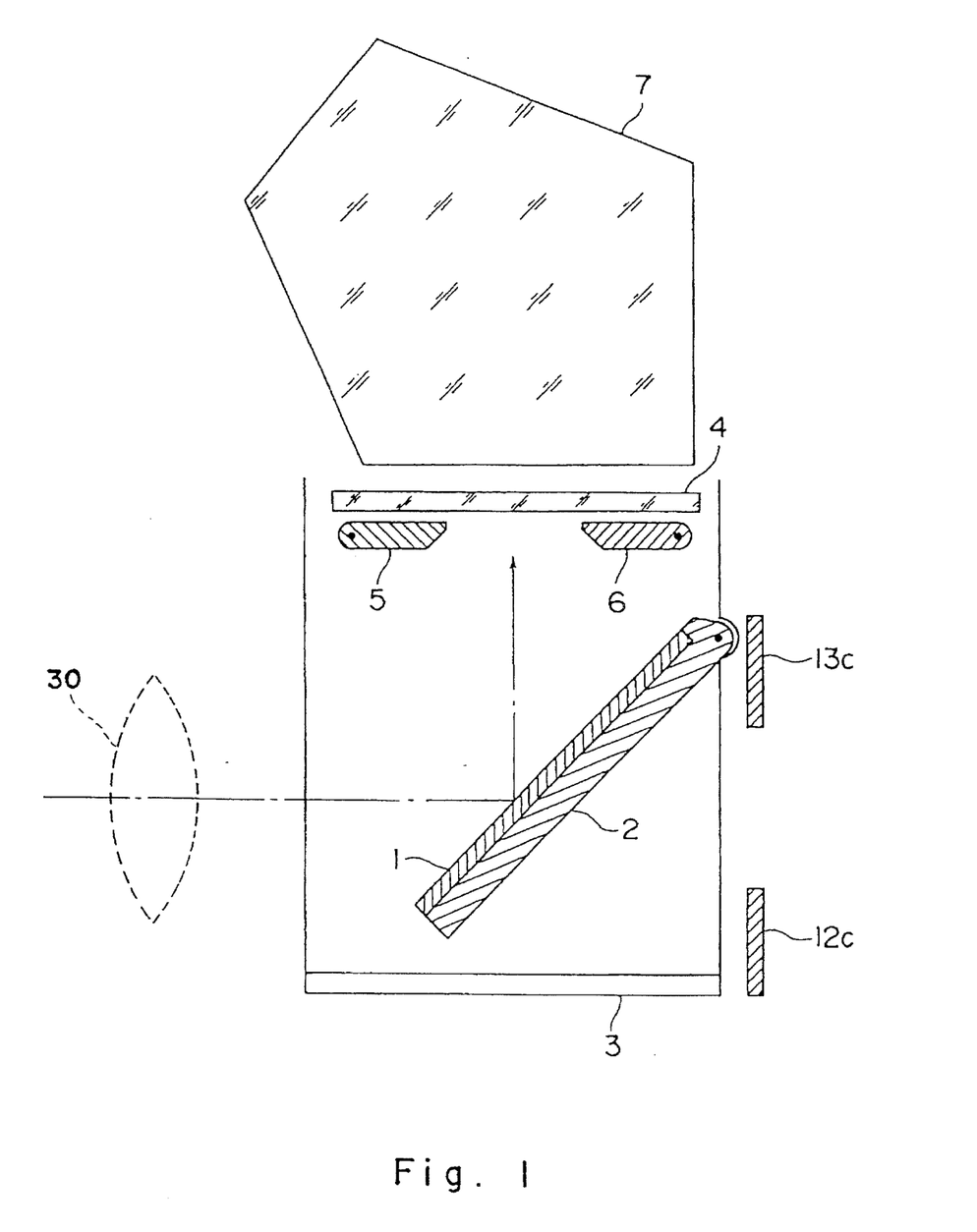
FIG. 1 is a cross-sectional view showing the important parts of the field frame changeover mechanism according to one embodiment of the present invention in panorama mode.
Figure 2:
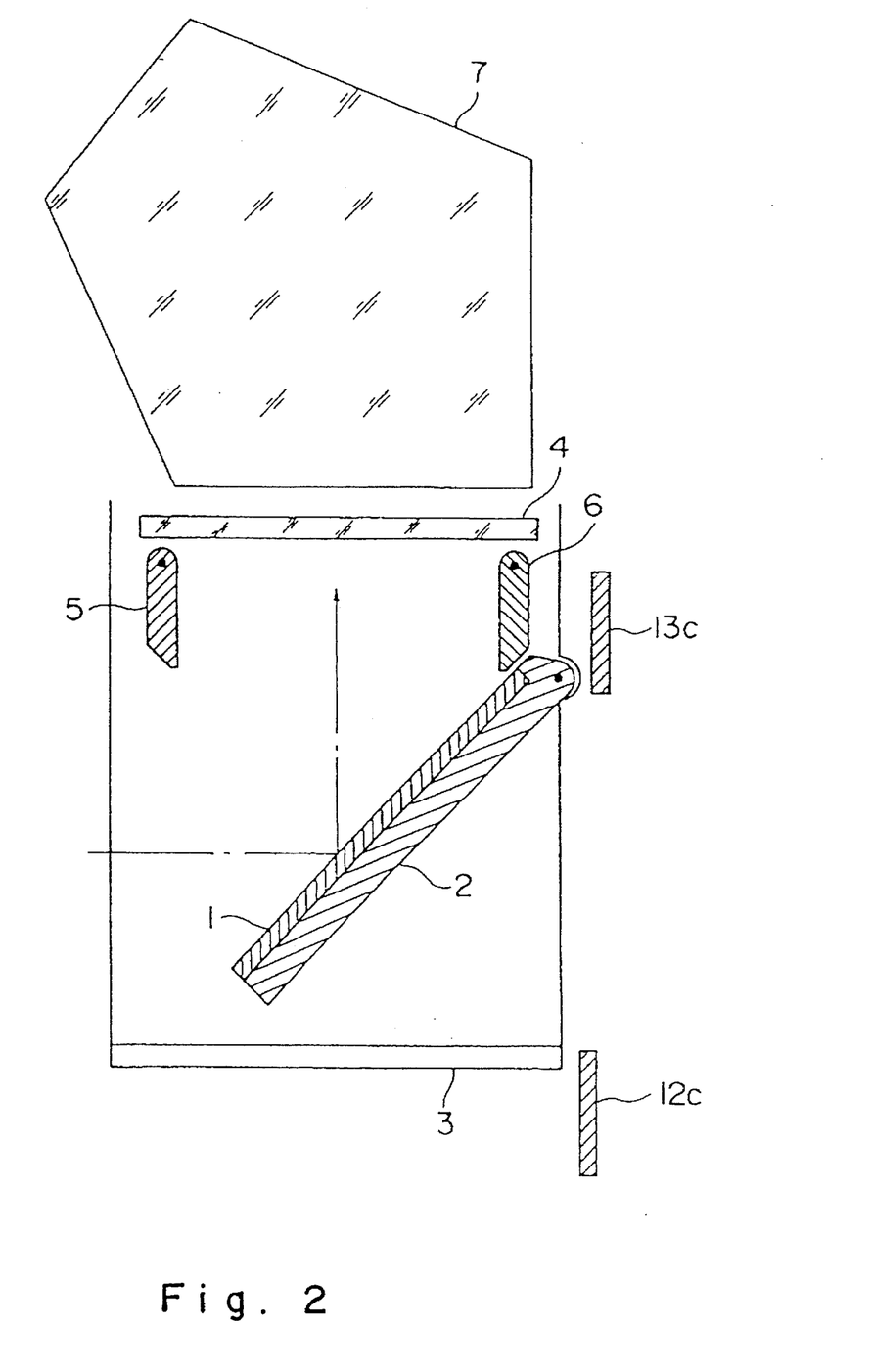
FIG. 2 is a cross-sectional view showing the important parts of the mechanism of FIG. 1 in full-size mode.
Figure 3:
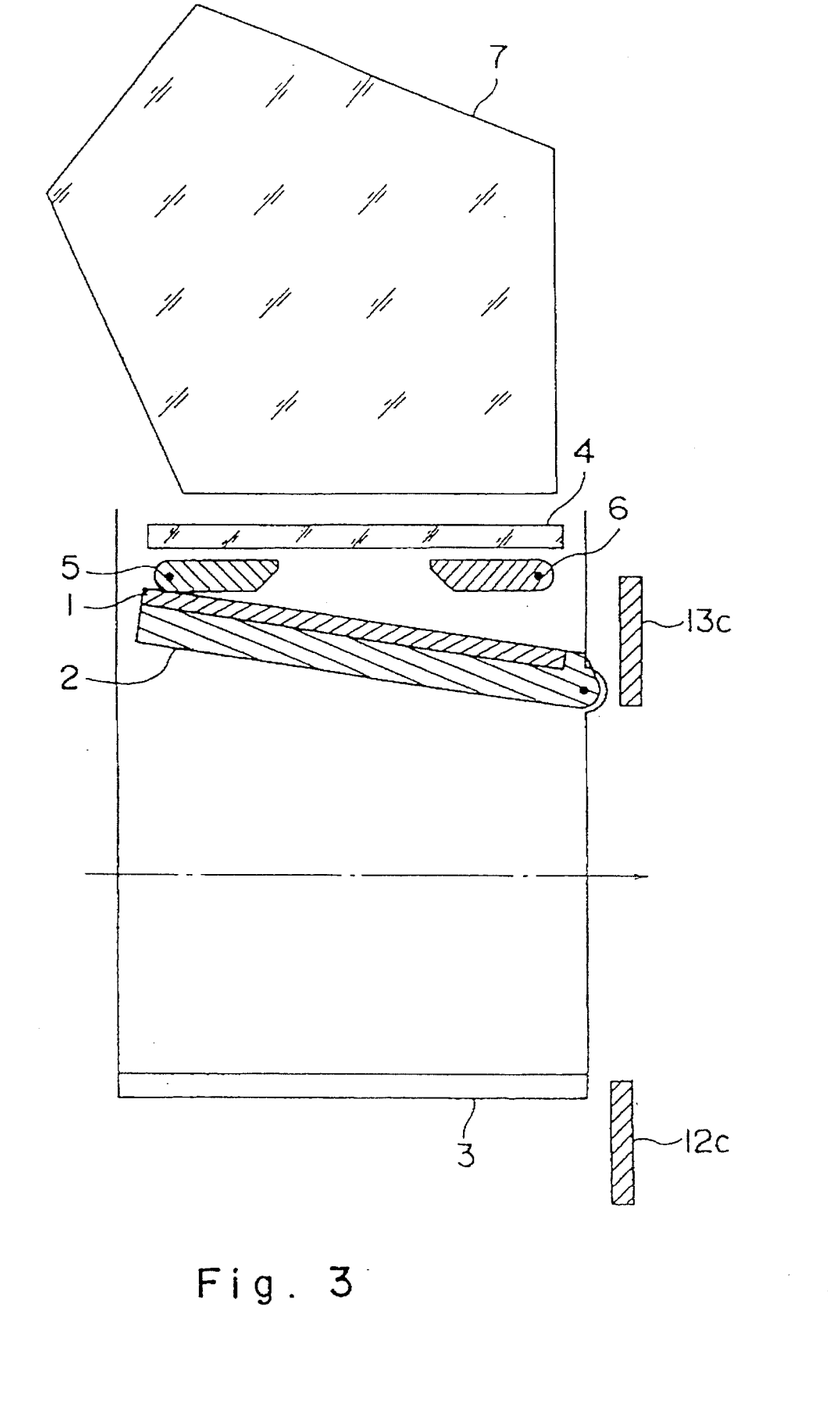
FIG. 3 is a cross-sectional view showing the important parts of the mechanism of FIG. 1 with the mirror moved up.

FIGS. 1, 2 and 3 are cross-sectional views showing the important parts of the field frame changeover mechanism. FIG. 1 illustrates the mechanism in panorama mode, FIG. 2 in full-size mode, and FIG. 3 when the mirror is moved up. In the drawings, 1 is a mirror which reflects the light transmitted through the photo-taking lens of a camera (schematically illustrated at 30 in FIG. 1) to the viewfinder optical system of the camera and 2 is a mirror support which supports mirror 1. Mirror support 2 is supported by mirror box 3 so that it can move between an observation position angled 45 degrees to the path of the light passing through the photo-taking lens to the film exposure surface as shown in FIGS. 1 and 2, and a photo-taking position retracted from the light path as shown in FIG. 3. Reference number 4 is a focusing screen located at the upper portion of mirror box 3. Under and near focusing screen 4 are located darkening plates 5 and 6 to restrict the field frame. Above focusing screen 4 is located pentagonal roof prism 7 to direct the light reflected by mirror 1 to the eyepiece of the viewfinder optical system. Darkening plates 5 and 6 are placed between focusing screen 4 and mirror 1 at the photo-taking position such that they may be set at a darkening position as shown in FIG. 1, in which portions of focusing screen 4 are covered, or at an open position as shown in FIG. 2, in which almost the entire area of focusing screen 4 is open.

Figure 4:
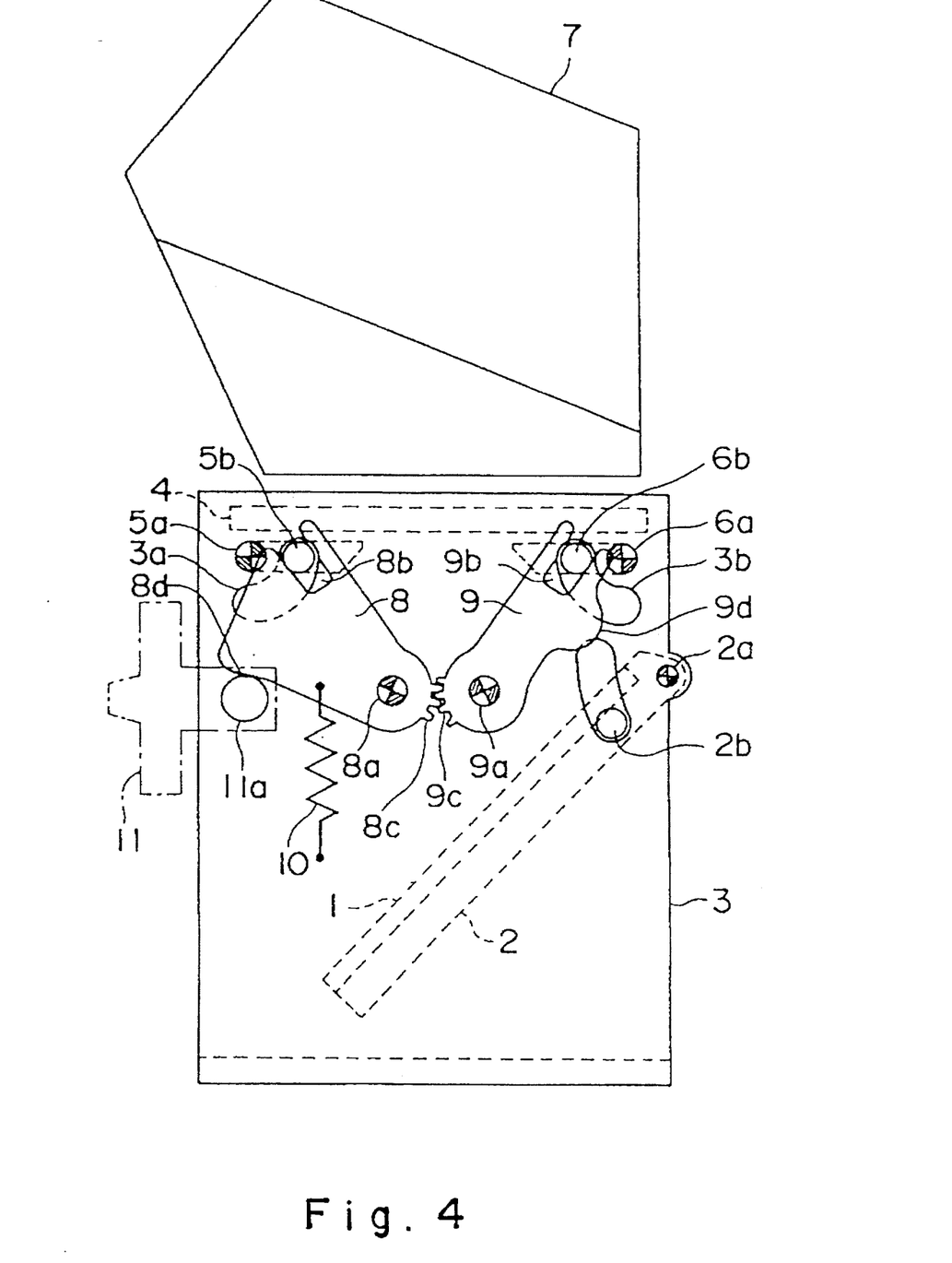
FIG. 4 is a cross-sectional view showing the drive mechanism for the darkening plates of FIG. 1 in panorama mode.
Figure 5:
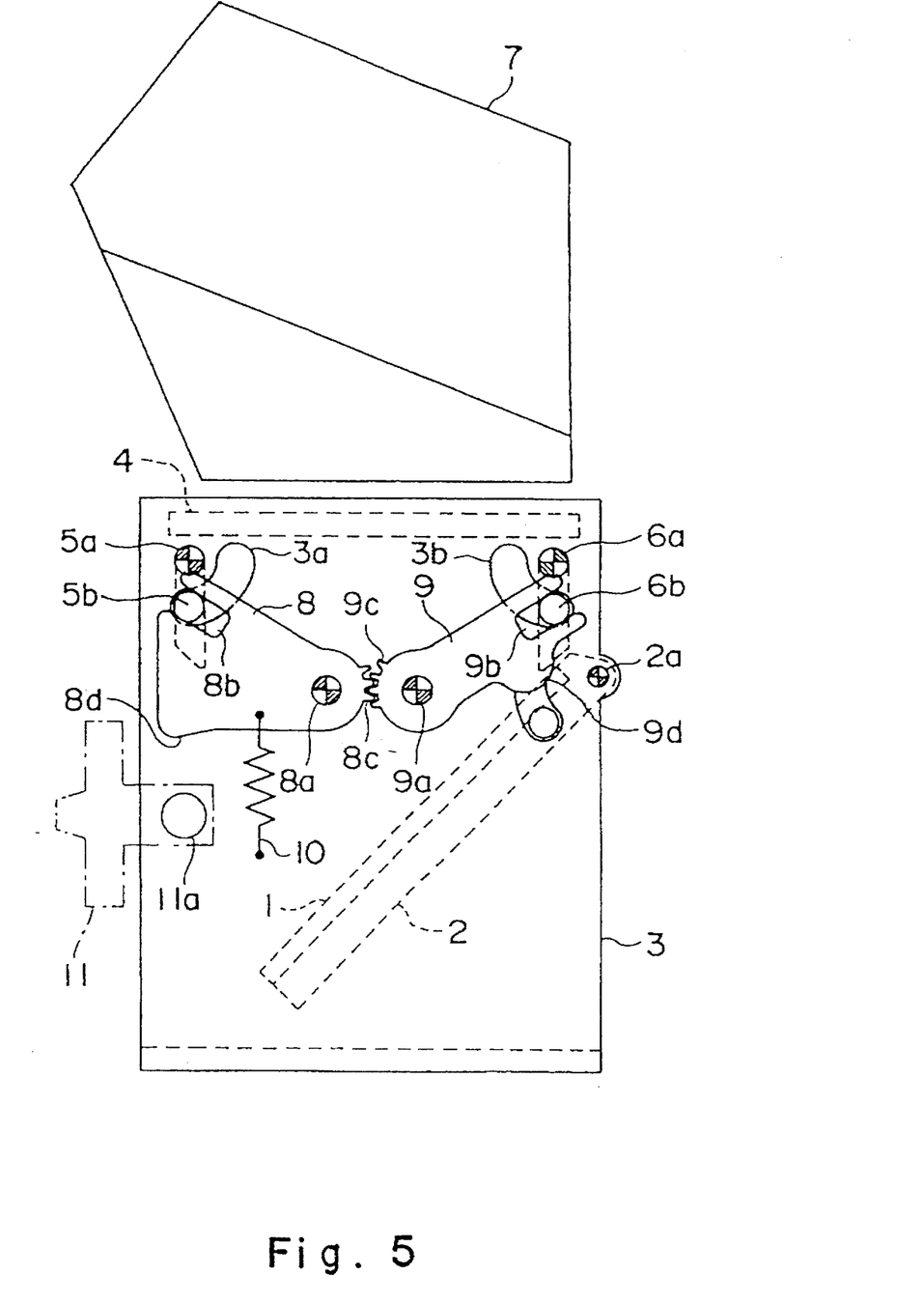
FIG. 5 is a cross-sectional view showing the drive mechanism of FIG. 4 in full-size mode.
Figure 6:
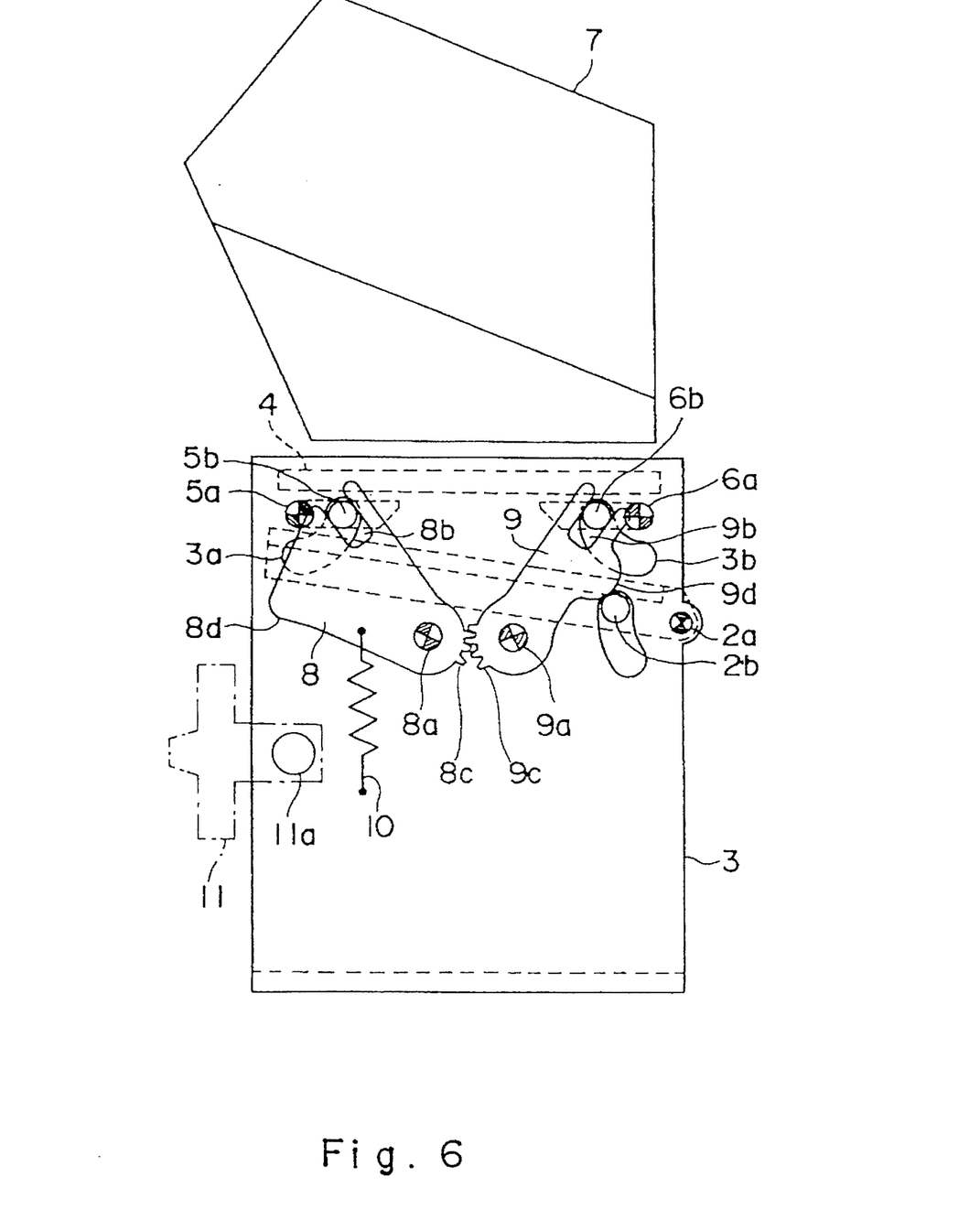
FIG. 6 is a cross-sectional view showing the drive mechanism of FIG. 4 with the mirror moved up.

FIGS. 4 through 6 show the drive mechanism for darkening plates 5 and 6. FIG. 4 illustrates the drive mechanism in panorama mode, FIG. 5 in full-size mode and FIG. 6 when mirror 1 is moved up. The drive mechanism shown in the drawings is located on the side of mirror box 3. As shown in the drawings, darkening plates 5 and 6 are rotatably mounted on mirror box 3 via support axes 5a and 6a, respectively. In addition, darkening plates 5 and 6 have pins 5b and 6b on their side ends, respectively and mirror box 3 has guide grooves 3a and 3b which guide pins 5b and 6b such that darkening plates 5 and 6 can each rotate approximately 90 degrees.

Darkening plates 5 and 6 are driven by first and second drive levers 8 and 9. Drive levers 8 and 9 are rotatably supported by support axes 8a and 9a fixed on mirror box 3 such that they rotate in mutually opposing directions around support axes 8a and 9a via gears 8c and 9c formed to engage with each other. First drive lever 8 has a groove 8b on a line passing through the center of support axis 8a, in which pin 5b is movably inserted. Second drive lever 9 has a groove 9b on a line passing through the center of support axis 9a, in which pin 6b is movably inserted. Further, first drive lever 8 has a protrusion 8d which protrudes outward from the line connecting support axis 8a and groove 8b, and second lever 9 has a protrusion 9d which protrudes outward from the line connecting support axis 9a and groove 9b.

First drive lever 8 is given a driving force by spring 10 such that it rotates counterclockwise in the drawings around support axis 8a. Therefore, darkening plates 5 and 6 are normally kept in the retracted position shown in FIGS. 2 and 5, corresponding to the full-size mode. On the other hand, a changeover operation member 11 is located near mirror box 3 and is mounted on the camera in such a manner that it may be operated from outside the camera. When drive pin 11a on operation member 11 is moved up, first drive lever 8 rotates clockwise in the drawings around support axis 8a, and darkening plates 5 and 6 are moved to and kept in the darkening position shown in FIGS. 1 and 4 corresponding to the panorama mode. In addition, when mirror 1 is moved up to the photo-taking position in the full-size mode, second drive lever 9 rotates counterclockwise in the drawings around support axis 9a by drive pin 2b formed on mirror support 2, and darkening plates 5 and 6 rotate from the open position to the darkening position. When mirror 1 returns to the observation position, the restriction of drive levers 8 and 9 by drive pin 2b is released, whereupon darkening plates 5 and 6 return to the open position by the spring force of spring 10. In the panorama mode, because both drive levers 8 and 9 are maintained in the position shown in FIG. 4 by operation member 11, darkening plates 5 and 6 are maintained in the darkening position irrespective of the movement of mirror 1.

As described above, in the present embodiment, darkening plates 5 and 6, which are situated inside mirror box 3 so as to protrude toward mirror 1 at the time of full-size photo-taking, are constructed such that they extend along focusing screen 4 as mirror 1 is moved up at the time of shutter release. Because of this, the movement of mirror 1 is prevented from limiting the arrangement of the changeover mechanism, which makes it unnecessary to increase the size of the camera. In addition, because darkening plates 5 and 6 are located near focusing screen 4, and near an object image formation of the optical system of the viewfinder when in the darkening position, blurring of field frame 4 inside the viewfinder is prevented, and good visual confirmation of the viewfinder field can be obtained.

Figure 7:
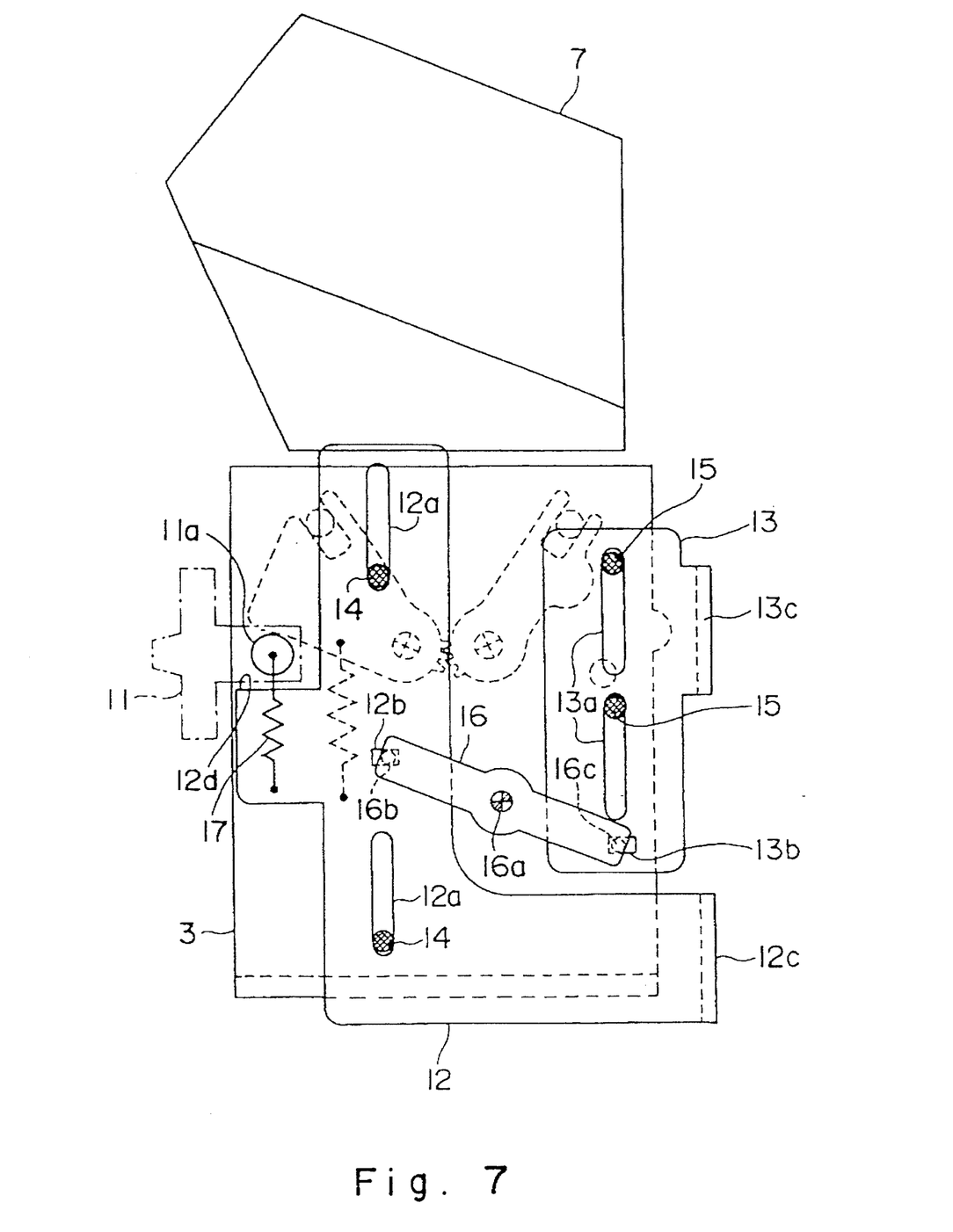
FIG. 7 is a cross-sectional view showing the exposure area changeover mechanism of the present invention in panorama mode.
Figure 8:
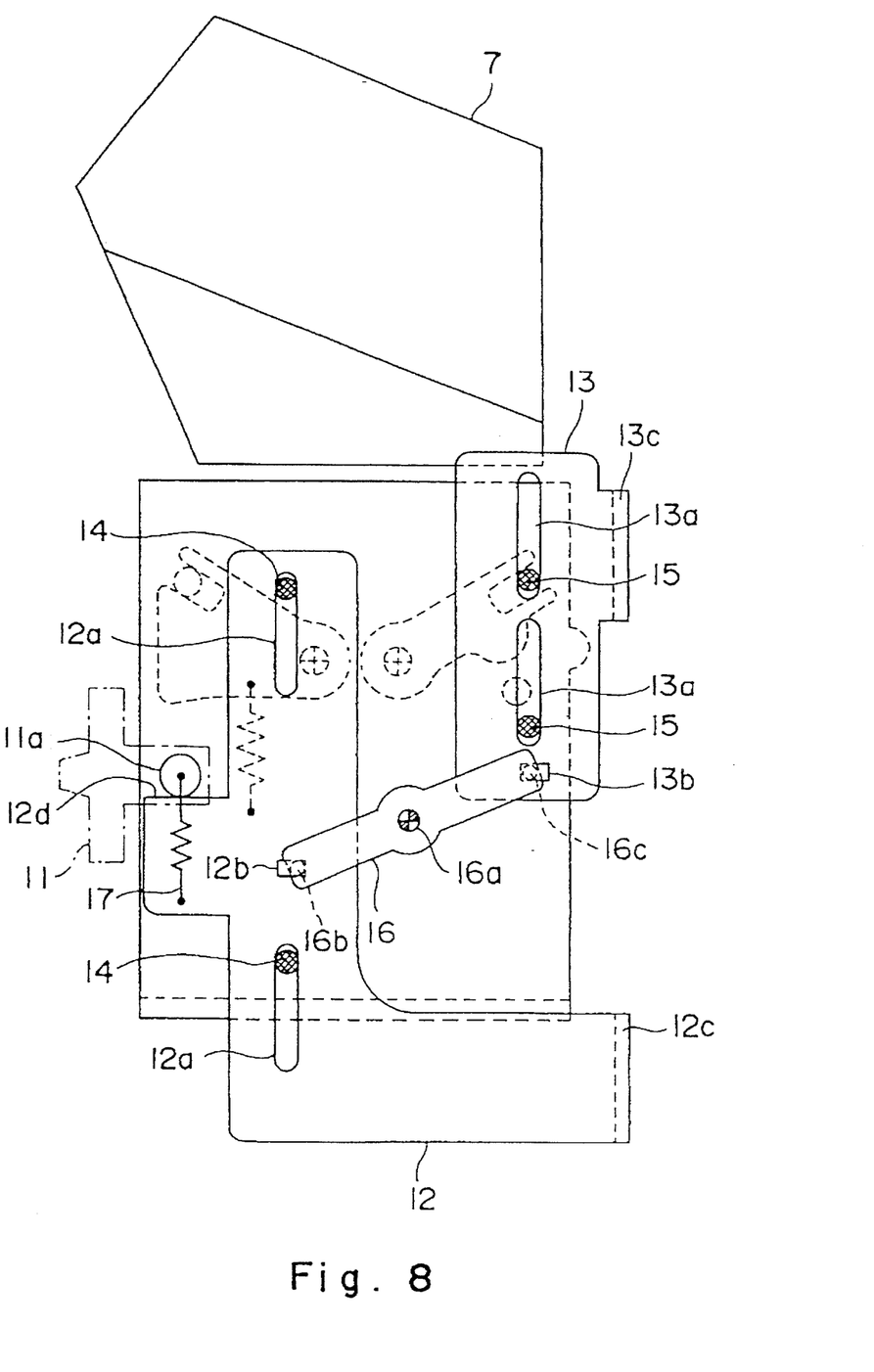
FIG. 8 is a cross-sectional view showing the exposure area changeover mechanism of FIG. 7 in full-size mode.
Figure 9:
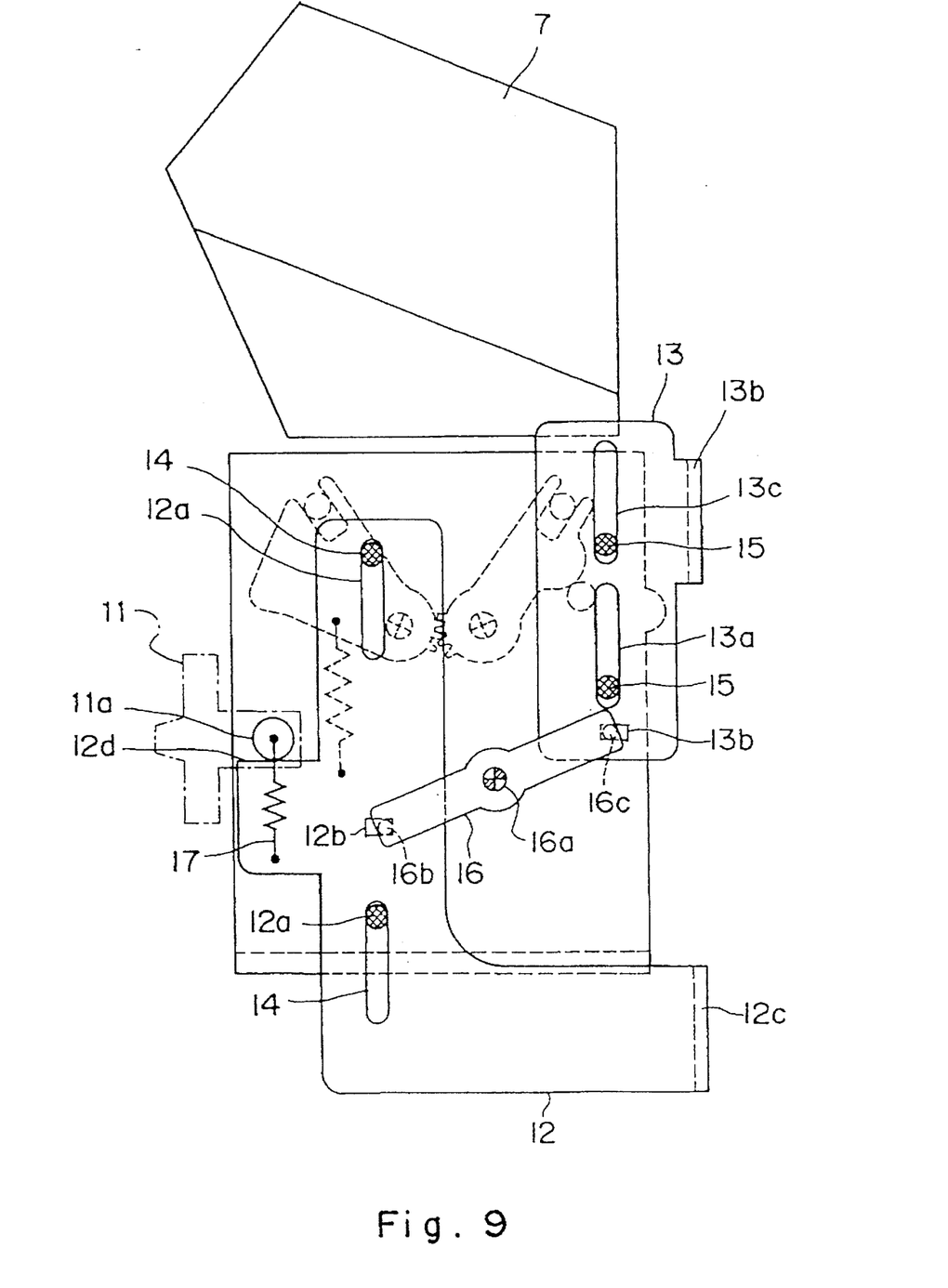
FIG. 9 is a cross-sectional view showing the exposure area changeover mechanism of FIG. 7 with the mirror moved up.

On the other hand, in the camera of the present embodiment, the changeover of the film exposure area is carried out in connection with the switching of the viewfinder field. FIGS. 7 through 9 show the exposure area changeover mechanism. FIG. 7 illustrates the mechanism in panorama mode, FIG. 8 in full-size mode and FIG. 9 when mirror 1 is moved up. The mechanism shown in FIGS. 7 through 9 is located to the side of mirror box 3 similar to the field frame changeover mechanism.

Reference numbers 12 and 13 are darkening members for the switching of the exposure area. Darkening members 12 and 13 have long holes 12a and 13a, respectively, to guide the vertical movement of the darkening members, which are mounted to guide pins 14 and 15 fixed on the side of mirror box 3. Darkening members 12 and 13 also have long holes 12b and 13b extending horizontally in the drawing, in which pins 16b and 16c formed on both ends of connecting lever 16, which rotates around axis 16a, are inserted. Therefore, when darkening member 12 slides up, darkening member 13 slides down and when darkening member 12 slides down, darkening member 13 slides up. Because of this, the exposure area is limited via darkening parts 12c and 13c of darkening members 12 and 13, which are located in front of the film.

Darkening members 12 and 13 alternate between the panorama mode shown in FIG. 7 and the full-size mode shown in FIG. 8 via the operation of changeover operation member 11 described above. When changeover operation member 11 is down, drive pin 11a presses down protrusion 12d of darkening member 12. Consequently, connecting lever 16 rotates counterclockwise around axis 16a and darkening member 13 is lifted, whereby an exposure area corresponding to full-size photo-taking is obtained. Conversely, when operation member 11 is moved up, darkening member 12 connected to drive pin 11a via spring 17 is lifted, and darkening members 12 and 13 move to the ends of their movement range dictated by long holes 12a and 13a. Spring 17 is designed such that it extends somewhat when this happens, as a result of which the upper and lower edges of the exposure area in the panorama mode are fixed at certain locations at all times. The picture frame changeover mechanism, as described above, operates simultaneously with the field frame changeover mechanism via the operation of operation member 11, while when mirror 1 is moved up in full-size mode as shown in FIG. 9, the picture frame changeover mechanism does not operate in connection with the movement of the mirror.

Figure 10:
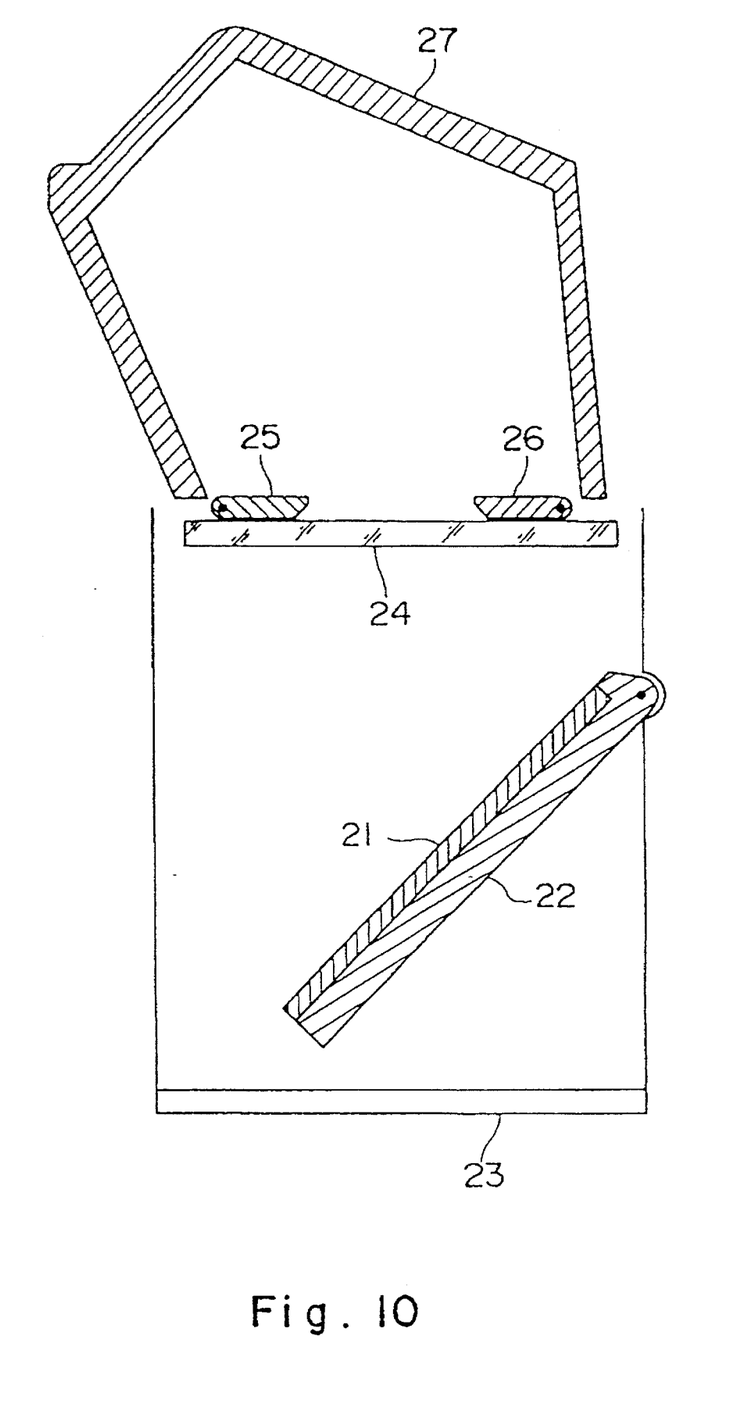
FIG. 10 is a cross-sectional view showing the important parts of a field frame changeover mechanism of a modified embodiment of the present invention in panorama mode.
Figure 11:
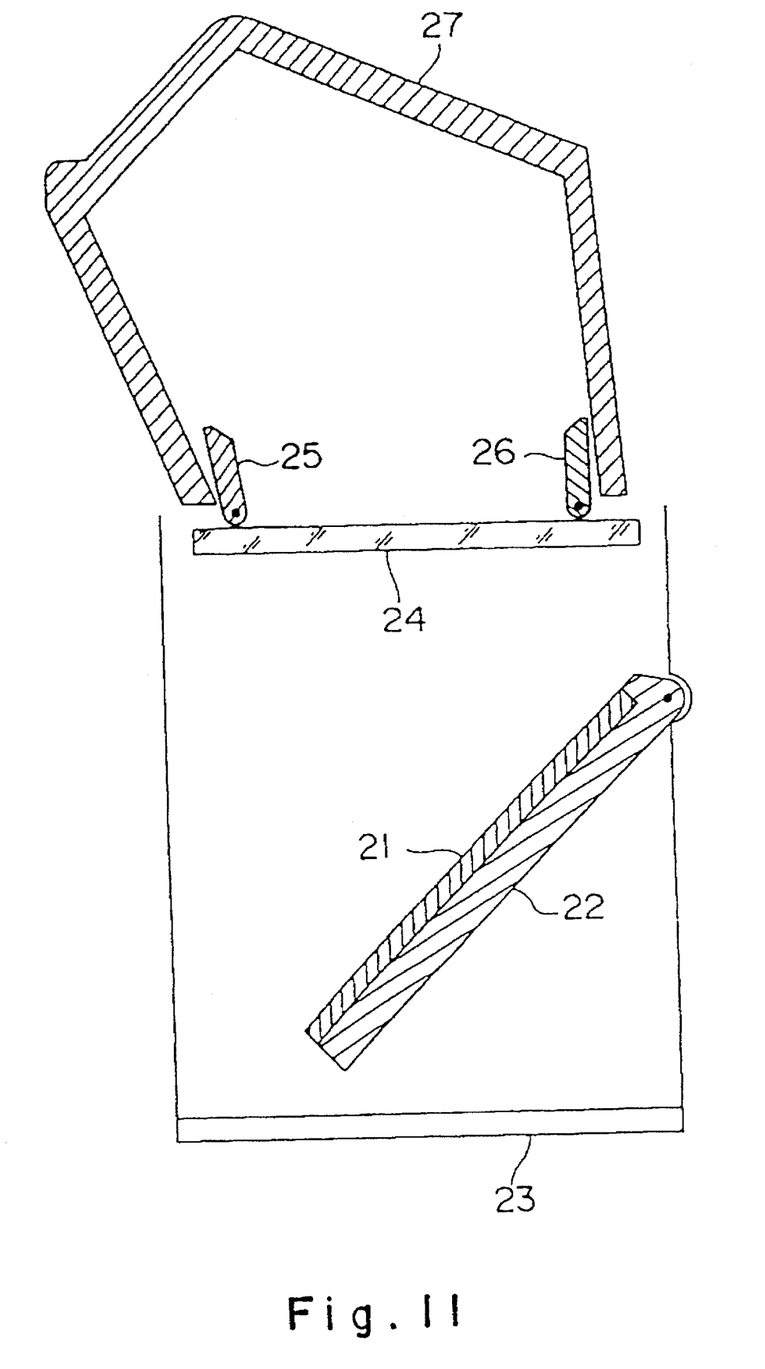
FIG. 11 is a cross-sectional view showing the important parts of the mechanism of FIG. 10 in full-size mode.

Next, the field frame changeover mechanism of a modified embodiment of the present invention shown in FIGS. 10 and 11 is described. FIGS. 10 and 11 are cross-sectional views showing the important parts of the field frame changeover mechanism according to the modified embodiment. FIG. 10 illustrates the mechanism in panorama mode and FIG. 11 in full-size mode. As shown in the drawings, this modified embodiment is different from the previous embodiment in that the camera has pentamirror 27 instead of a pentaprism, and darkening plates 25 and 26 are located on the upper side of focusing screen 24. In the drawings, 21, 22 and 23 are a mirror, a mirror support and a mirror box, respectively. In addition, in the previous embodiment, darkening plates 25 and 26 can perform switching between full-size mode and panorama mode using a mechanism located on the side of mirror box 23 equivalent to that shown in FIGS. 4 through 6, but in this modified embodiment, because darkening plates 25 and 26 are not in the way of the movement of mirror 21 even in full-size mode, the mechanism to retract darkening plates 25 and 26 for the upward movement of the mirror is not provided.

Even when darkening plates 25 and 26 are constructed such that they extend along the upper surface of focusing screen 24 in panorama mode and protrude into pentamirror 27 in full-size mode, an increase in the size of the camera, as well as any restriction caused by the mirror to the arrangement of the changeover mechanism, can be prevented.

It should be understood that the present invention may be embodied in other specific forms than those described above without departing from the spirit or essential characteristics thereof. The above-described embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A viewfinder field frame changeover mechanism for a single-lens reflex camera equipped with a viewfinder, wherein a field frame for a first field of view and another field frame for a second field of view having a range different from the first field of view are interchangeable, comprising:

a photo-taking lens;

a mirror which, when a shutter of the camera is released, moves from an observation position in a path of light transmitted through said photo-taking lens, where the transmitted light is reflected toward an optical system of the viewfinder, to a photo-taking position outside the light path;

a focusing screen;

darkening plates located between said focusing screen and said mirror, said darkening plates being movable between a darkening position where the darkening plates cover a part of the focusing screen and an open position where the focusing screen is uncovered by the darkening plates, wherein said darkening plates are, when in said open position, in the locus of movement of said mirror to said photo-taking position;

an operation mechanism which selectively sets said darkening plates to either said darkening position or said open position; and a drive mechanism which, when the darkening plates are in the open position, moves said darkening plates to said darkening position in correlated fashion with the movement of said mirror from the observation position to the photo-taking position, so that said darkening plates move out of the locus of movement of said mirror and to said open position in correlated fashion with the movement of said mirror from the photo-taking position to the observation position.

2. The mechanism as recited in claim 1, wherein said first field of view corresponds to full-size photo-taking and said second field of view corresponds to panorama photo-taking.

3. The mechanism as recited in claim 1, wherein said darkening plates are rotatably supported around axes perpendicular to an optical axis of said camera.

4. A mechanism as recited in claim 1, wherein said darkening plates are positioned along an optical axis formed by said mirror and said focusing screen at the open position.

5. A mechanism as recited in claim 1 further comprising a covering mechanism which is operated to a cover position where an exposure frame is partially covered corresponding to said darkening position and an opened position where the exposure frame is opened corresponding to said open position, and an interlock mechanism which interlocks said covering mechanism and said drive mechanism.

6. A mechanism as recited in claim 5, wherein said interlock mechanism releases the interlock when said darkening plates are positioned in the open position so that said darkening plates are capable of moving with said covering mechanism being stationary.

7. A viewfinder field frame changeover mechanism for a single-lens reflex camera equipped with a viewfinder, wherein a field frame for a first field of view and another field frame for a second field of view having a range different from the first field of view are interchangeable, comprising:

a pentamirror composed of more than one mirror; and darkening plates located inside a hollow area created by the pentamirror, wherein said darkening plates are movable between a darkening position where the darkening plates cover a part of a focusing screen and an open position where the focusing screen is uncovered by the darkening plates.

8. A single-lens reflex camera including a viewfinder in which a field frame for a first field of view and another field frame for a second field of view having a range different from the first field of view are interchangeable, and a field frame changeover mechanism for changing the field frame between the field frame for the first field of view and the field frame for the second field of view; the improvement comprising wherein the field frame changeover mechanism is located on a lateral side of a mirror box which supports a mirror which reflects light transmitted through a photo-taking lens of the camera to an optical system of the viewfinder.

9. A mechanism as recited in claim 8 further comprising a mechanism which changes over an exposure frame between a first shape frame corresponding to said first field frame and a second shape frame corresponding to said second field frame, and an interlock mechanism located at said side of the mirror box and which interlocks said exposure frame changeover mechanism and said field frame changeover mechanism.

10. A single-lens reflex camera comprising:

an exposure frame in which a first field frame for a first field of photographing and a second field frame for a second field of photographing having a range different from the first field of photographing are interchangeable;

a viewfinder in which a first field frame for a first field of view corresponding to said first field of photographing and a second field frame for a second field of view corresponding to said second field of photographing are interchangeable; and a field frame changeover mechanism for changing over said exposure frame together with said viewfinder between said each first field frame and said each second field frame;

the improvement comprising wherein said field frame changeover mechanism is located on a lateral side of a mirror box which supports a mirror which swings from a first position to reflect light transmitted through a photo-taking lens of the camera to an optical system of said viewfinder, and a second position to permit the light to fall on a focal plane via said exposure frame, and vice versa.

* * * * *